United States Patent [19]

Jousselin et al.

[11] Patent Number: 5,134,694
[45] Date of Patent: Jul. 28, 1992

[54] METHOD AND DEVICE FOR THE PROCESSING OF ADDRESS WORDS

[75] Inventors: Christian Jousselin, Puteaux; Jean-Paul Moskowitz, Paris, both of France

[73] Assignee: U.S. Philips Corporation, New York, N.Y.

[21] Appl. No.: 336,175

[22] Filed: Apr. 11, 1989

[30] Foreign Application Priority Data

Apr. 12, 1988 [FR] France .................. 88 04809

[51] Int. Cl.⁵ .................................. G06F 12/00
[52] U.S. Cl. .................... 395/400; 364/DIG. 2; 364/958.3; 364/955.1
[58] Field of Search ... 364/200 MS File, 900 MS File

[56] References Cited

U.S. PATENT DOCUMENTS

| | | | |
|---|---|---|---|
| 4,356,549 | 10/1982 | Chueh | 364/200 |
| 4,361,868 | 11/1982 | Kaplinsky | 364/200 |
| 5,023,777 | 6/1991 | Sawamoto | 364/200 |

*Primary Examiner*—Thomas M. Heckler
*Attorney, Agent, or Firm*—Lesley Rhyne; Anne E. Barschall

[57] ABSTRACT

Process for the management of address words which determines destination addresses for the switching of data on the basis of input address words of (M+N) bits. The process includes the following steps:

on the basis of two input address words, separation of each one of these words into two fields of M and N bits respectively combination of these fields in accordance with a law of composition of non-commutative groups in order to deliver destination addresses emanating from the combination.

The composition laws which are implemented necessitate only simple operations. Also a unit for the management of address words. This permits reduction of the addressing periods in searching for data, for example when they are stored in memory.

10 Claims, 7 Drawing Sheets

$$\begin{bmatrix} 1 & 0 \\ 0 & 1 \end{bmatrix} \quad \begin{bmatrix} \sqrt{2}/2 & -\sqrt{2}/2 \\ \sqrt{2}/2 & \sqrt{2}/2 \end{bmatrix} \quad \begin{bmatrix} 0 & -1 \\ 1 & 0 \end{bmatrix} \quad \begin{bmatrix} -\sqrt{2}/2 & -\sqrt{2}/2 \\ \sqrt{2}/2 & -\sqrt{2}/2 \end{bmatrix}$$

| 0 | 0,0,0 | | 0 | 0,0,1 | | 0 | 0,1,0 | | 0 | 0,1,1 |

$e \qquad\qquad t \qquad\qquad t^2 \qquad\qquad t^3$ $$\begin{bmatrix} -1 & 0 \\ 0 & -1 \end{bmatrix} \quad \begin{bmatrix} -\sqrt{2}/2 & \sqrt{2}/2 \\ -\sqrt{2}/2 & -\sqrt{2}/2 \end{bmatrix} \quad \begin{bmatrix} 0 & 1 \\ -1 & 0 \end{bmatrix} \quad \begin{bmatrix} \sqrt{2}/2 & \sqrt{2}/2 \\ -\sqrt{2}/2 & \sqrt{2}/2 \end{bmatrix}$$

| 0 | 1,0,0 | | 0 | 1,0,1 | | 0 | 1,1,0 | | 0 | 1,1,1 |

$t^4 \qquad\qquad t^5 \qquad\qquad t^6 \qquad\qquad t^7$ $$\begin{bmatrix} -1 & 0 \\ 0 & +1 \end{bmatrix} \quad \begin{bmatrix} -\sqrt{2}/2 & -\sqrt{2}/2 \\ -\sqrt{2}/2 & \sqrt{2}/2 \end{bmatrix} \quad \begin{bmatrix} 0 & -1 \\ -1 & 0 \end{bmatrix} \quad \begin{bmatrix} \sqrt{2}/2 & -\sqrt{2}/2 \\ -\sqrt{2}/2 & -\sqrt{2}/2 \end{bmatrix}$$

| 1 | 0,0,0 | | 1 | 0,0,1 | | 1 | 0,1,0 | | 1 | 0,1,1 |

$s \qquad\qquad st \qquad\qquad st^2 \qquad\qquad st^3$ $$\begin{bmatrix} 1 & 0 \\ 0 & -1 \end{bmatrix} \quad \begin{bmatrix} \sqrt{2}/2 & \sqrt{2}/2 \\ \sqrt{2}/2 & -\sqrt{2}/2 \end{bmatrix} \quad \begin{bmatrix} 0 & 1 \\ 1 & 0 \end{bmatrix} \quad \begin{bmatrix} -\sqrt{2}/2 & \sqrt{2}/2 \\ \sqrt{2}/2 & \sqrt{2}/2 \end{bmatrix}$$

| 1 | 1,0,0 | | 1 | 1,0,1 | | 1 | 1,1,0 | | 1 | 1,1,1 |

$st^4 \qquad\qquad st^5 \qquad\qquad st^6 \qquad\qquad st^7$

FIG. 5B

METHOD AND DEVICE FOR THE PROCESSING OF ADDRESS WORDS

BACKGROUND TO THE INVENTION

The invention relates to a method for processing in a data processor input address words of M+N bits each for generating destination addresses for an addressable structure.

It also relates to a device for processing address words utilizing thus method. Such a device may be realized as a computer, microprocessor, data management unit, storage device or other device, which apart from any other functional element that could benefit from the realization of the invention, could have elements for embodying the invention, to generate destination addresses for therewith accessing an addressable structure. The destination address location may be dedicated to storing data, further addresses, instructions, or other data.

DESCRIPTION OF EXEMPLARY PRIOR ART

A method according to the above has been described in U.S. Pat. No. 4,361,868 having the same assignee. This patent relates to the conversion of logical addresses to physical addresses. A logical address can be envisioned as a number tagged to an associated data item, as such number may be handled by the computer software. A physical address indicates a physical location in the memory. The present invention does not relate to a conversion between two addressing levels as diverse as the above, but abstracts from this conversion. Thus it could be effected either with respect to the logical address, or with respect of physical addresses, the above implying no limitation on the actual level with respect to the referenced conversion.

FIELD OF THE INVENTION

Now, in modern so-called abstract type programming languages, or languages for artificial intelligence, various advanced software concepts are: data structure, program structure, programming by the data. In artificial intelligence languages, no difference of form exists between a data item and a program. This trend toward structuring improves the readability of software in order to facilitate the maintenance thereof. However, this often causes an increased access time to the information items stored in memory.

In a general way, the accessing of a data item will be done on the basis of an initial address (first binary word) to which is added to jump value (second binary word) in order to deduce the destination address for accessing memory. Just as indicated for the word "data item" the word "memory" concerns firstly the conventional concept of memory, but also any organized structure of which the contents may be addressed selectively.

A memory is a finite set of memory elements. Its structure is a group structure, in the mathematical sense of the theory of groups, which structure is specified by an address translation law. Customary addressing modes serving for the displacement in memory utilize this law. The memory does not in itself contain its address structure, and the address associated with each memory element is only an identifier; there is, a priori, no link between any pair of addresses. The standard address translation law, implemented generally in an arithmetic and logic unit represents a single, fixed, address sequence. The associated translation law is the law of addition of integers; this imparts to the memory a cyclic group structure, which is commutative, and of which the associated graph is a circle. The configuration of the central memory determines the structures of the data, and with the cyclic addressing organization the latter structures are configured as one-dimensional tables.

This organization of the addressing was developed for stored program computers. A diagrammatic representation of such an organization is provided by FIG. 2 of the article "Les hyperordinateurs" (The Super Computers) by P. Quinton in La recherche volume 16, no. 167, June 1985. A processing unit an a control unit exchange addresses and data with a memory. The addresses are sequence numbers which permit the writing and reading of data in memory. The instructions provided by the control unit are decoded and then executed. In accordance with such an organization, the next following instruction implicitly is the one that follows the preceding one in memory. However, for current high-level languages such addressing mechanisms require much time.

SUMMARY TO THE INVENTION

It therefore, among other things, is an object of the present invention to reduce delays incurred by the addressing mechanism. This is in principle realized by a novel type of addressing organization. The vehicle therefore is the change-over from the cyclic group structure of conventional addresses to the non-commutative group structure of the present invention. Such non-commutative groups are well-known. A classic and very easy-to-read explanation is provided in H. S. M. Coxeter et al., Generators and relations for discrete groups, Springer, Berlin and others, 1957, pages 1-32. However, the latter type of groups has not been used for addressing regular array structures in data processing. Now, according to a first aspect of the invention, the object is realized in that a method for processing in a data processor input address words of M+N bits each for generating destination address for an addressable structure, characterized by the following steps:

on the basis of two input address words, separating each one of these words into two fields such that:
- the M most significant bits and the N least significant bits of the first input word constitute the fields I and J respectively,
- the M most significant bits and the N least significant bits of the second input word constitute the fields K and L respectively, combination of these fields in accordance with an operation which defines a non-commutative group with respect to the set of possible input addresses, for generating destination addresses for the addressable structure that comprise two fields F and G constituting respectively of the M most significant bits and of the N least significant bits emanating from the combination.

The laws of composition of non-commutative groups by themselves are well-known, each such law, once applied according to the invention yielding definite and specific advantages.

According to a first aspect, the method combines the fields in accordance with an operation which defines a metacyclic non-commutative group with respect to the set of possible input addresses and determines F and G such that:

$$F = I + K \text{ modulo } 2^M \text{ and}$$

$$G = L + J*b^K + [\text{overflow of } (I+K)]*2^P \text{ modulo } 2^N \quad (1)$$

where b and P are predetermined constants of the selected group such that $b^{2M} - 1$ is a multiple of $2^N$ and $b - 1$ is a multiple of $2^{N-P}$, and P is a positive integer less than or equal to N, and where the symbols (+) and (*) represent the operations of addition and of multiplication respectively.

In accordance with a further aspect of implementing a second non-commutative group, the fields I, J, K, L being formed respectively of the bits $(I_M \ldots I_1)$, $(J_N \ldots J_1)$, $(K_M \ldots K_1)$, $(L_N \ldots L_1)$, where the index of order 1 relates to the least significant bit of each field, the said process combines these fields in accordance with an operation which determines F and G such that:

$$F = I + K + J_1.K_1.C*2^{M-1} \text{ modulo } 2^M$$

and $$G = L + J*b^K + J_1.K_1*(y-b) + J_1.K_2.d*2^{N-1} + [\text{overflow of } (I+K+J_1.K_1.C*2^{M-1})]*2^P \text{ modulo } 2^N \quad (2)$$

where the symbols (+), (*) and (.) represent respectively addition, multiplication and the logic AND function, and where C, y, P, b, d are predetermined constants of the selected group.

This process may be implemented in accordance with the first variant of the invention in a unit for the management of input address words of (M+N) bits, which determines destination addresses for the accessing of data which determines the destination address on the basis of two input address words by dividing both of them, in the same manner, in accordance with two fields, the M most significant bits and the N least significant bits of the first input word constituting respectively the fields I and J, the M most significant bits and the N least significant bits of the second input word constituting respectively the fields K and L, the destination address being formed of two fields F and G consisting respectively of the M most significant bits and of the N least significant bits delivered by the management unit which comprises:

a first adder which delivers the field F such that $F = I + K \text{ modulo } 2^M$, a shifter which shifts over P binary positions the overflow bit delivered by the first adder and which delivers on N bits a shifted overflow word R, a second adder which adds L and the shifted overflow word R, a computing element which determines the expression $J*b^K$, a third adder which adds the result delivered by the computing element with the result delivered by the second adder and which delivers the field G such that $G = L + J*b^K + R \text{ modulo } 2^N$ where b and P are predetermined constants of the selected groups such that $b^{2M} - 1$ is a multiple of $2^N$ and $b - 1$ is a multiple of $2^{N-P}$, and P is a positive integer less than or equal to N.

It may also be implemented in accordance with the second variant in the aforementioned management unit modified in such a manner that the first adder operates on (M+1) bits and delivers 2 overflow bits which are input and shifted in the shifter and in that it further comprises a circuit for conditioning the input address words, the fields I, J, K, L being formed respectively of the bits $(I_M \ldots I_1)$, $(J_N \ldots J_1)$, $(K_M \ldots K_1)$, $(L_N \ldots L_1)$ where the index of order 1 relates to the least significant bit of each field, the conditioning circuit comprising:

on a first channel:
  a first AND gate which receives $J_1$, $K_1$ and a bit C
  a second AND gate which receives $I_M$ and the output of the first AND gate
  a first selector, actuated by the output of the first AND gate, which selects $I_M$ or its inverse logic value in such a manner that the first adder receives on one input:
    the M−1 least significant bits of the field I of the input address word,
    the output of the first selector as M-th bit,
    the output of the second AND gate as (M+1)-th bit
  and on the other input, the field K positioned on the M least significant bits of this input, the (M+1)-th bit being at zero, on a second channel:
  a third logic AND gate which receives $J_1$ and $K_1$ and which acts on a second selector which selects a value y−b or a null value,
  a fourth logic AND gate, which receives $J_1$, $K_2$ and a bit d, and which acts on a third selector which selects $L_N$ or its inverse logic value,
  a fourth adder which receives on one input the output of the second selector and on the other input the (N−1) least significant bits of the field L of the input address word as well as the output of the third selector as N-th bit, the output of the fourth adder entering the second adder, where C, y, P, b, d are predetermined constants of the selected group.

When a software designer utilizes, for example, a binary tree structure to describe the management of the addresses, he may be interested in running through these trees with the aid of right and left selectors. Now, these selectors are not interchangeable relative to one another: first right and then left addressing is not equivalent to first left and then right addressing. In order to implement such a non-commutative access mechanism, it is at least necessary to utilize a group structure having two generators, which are called in a general way s and t, corresponding, for example, to the two types of right and left displacement. A memory element of address a = i, j will be denoted: $s^i t^j$, where s and t are two parts of the address field.

The invention relates preferably to a metacyclic group having two generators, which can be defined by the following relations:

$$\{s, t \mid t^{2N} = e; \; s^{2M} = t^{2P}; \; ts = st^b\} \quad (3)$$

where the number of memory elements is $2^N * 2^M$ and where P and b are constants which are characteristic of the selected group, such that $b^{2M} - 1$ is a multiple of $2^N$ and $b - 1$ is a multiple of $2^{N-P}$, and P is positive and less than or equal to N. The relations of the form $s^i = t^j$ are interpreted in the following manner:

if j = 0 the propagation of the overflow following an operation at level i of the field s does not need to be taken into account, otherwise, the propagation of the overflow following an operation at level i of the field s must be undertaken at level i of the field t.

The operation which defines the metacyclic group is:

$$(s^i t^j) \$ (s^k t^l) = s^{i+k} t^{j+l} + j^* b^k + [\text{overflow of } i+k]^* 2^P$$

where the symbol ($) represents the operation. The operations on the fields of bits to be performed by the management unit are:

for the field s: i+k
for the field t: l+j*b^k+[overflow of (i+k)]*2^P.

In order to simplify the description, in what follows, when the management unit receives two address words respectively formed in two fields (I, J) and (K, L), the same letters will represent the numerical values which are associated with these fields.

Thus, the application of the relations (3) in the management unit will consist in determining the fields F and G of the destination address in accordance with the relations (1).

The invention als relates to the second non-commutative group having two fields, which is defined by the following relations:

$$\{s, t \mid t^{2N} = e; \; s^{2M} = t^{2P}; \qquad (4)$$
$$ts^2 = s^2 \cdot t^{b2+d^*2N-1}$$
$$t^2 s = s t^{2b}; \; ts = s^{1+C^*2M-1} t^y\}$$

where P, C, d, b, y are constants characterizing the law of the group.

Thus, the application of the formula (4) in the management unit will consist in determining the fields F and G of the destination address in accordance with the equations (2).

This leads to obtaining destination addresses which are no longer the product of the law of addition of integers but of a law of the non-commutative groups; this permits storage of and access to the data with reduced periods of time.

BRIEF DESCRIPTION OF THE FIGURES

The invention will be better understood with the aid of the following figures, which are given by way of non-limiting examples and in which:

FIGS. 5A and 5B show an example representing a problem of rotation symmetry;

DESCRIPTION OF PREFERRED EMBODIMENTS

Figure 1:
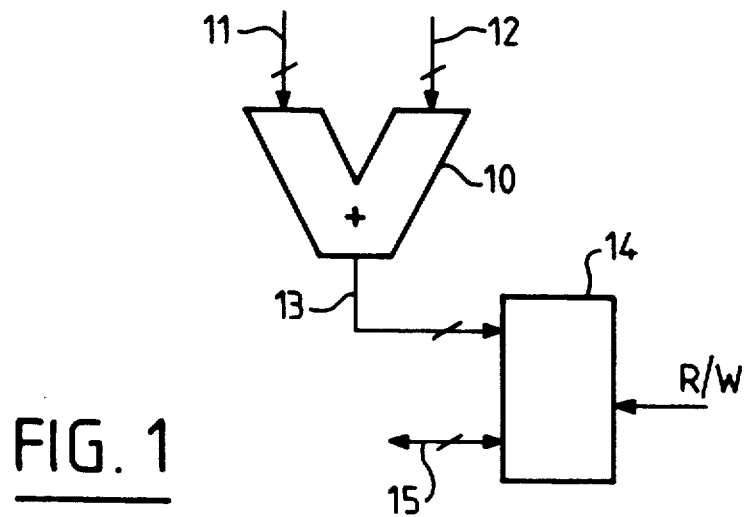
FIG. 1 shows a diagram indicating the customary mode of addressing.

FIG. 1 shows a diagram of the customary mode of addressing. The determination of the destination address is undertaken by means of an adder 10 which receives, on the buses 11 and 12, generally an initial address to which it adds an offset value. It delivers a destination address on the output bus 13, which addresses a memory 14. The latter, by means of a read-/write signal R/W, supplies or receives data on a bus 15. The law implemented is, in this case, the law of traditional addition of integers, which permits the addressing of the data item in the memory. The adder 10 is generally a functional part of an arithmetic and logic unit (ALU).

Figure 2:
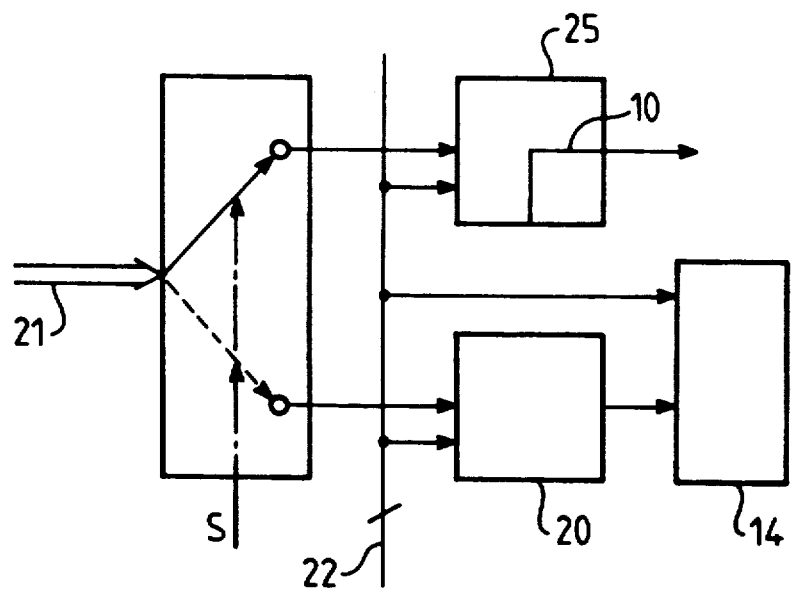
FIG. 2 shows a diagram demonstrating the insertion of the management unit in a pre-existing structure.

FIG. 2 represents a diagram showing the insertion of the management unit according to the invention in a pre-existing structure such as that of FIG. 1. As its name indicates, the ALU 25, which includes the adder 10, carries out both arithmetic and logic operations, these taking place on data or on addresses.

According to the invention, the management unit 20 will accept the commands of the arithmetic operations on the addresses which will therefore no longer be executed by the ALU. These operations are detected in the global structure by means of a control signal S, which assigns these operations to management unit 20 and assigns to the ALU 25 all the other operations. All of the operations appear on the bus 21. Thus, the management unit 20 operates directly on the addresses which are present on the general bus 22 and acts on the memory 14.

Figure 3A:
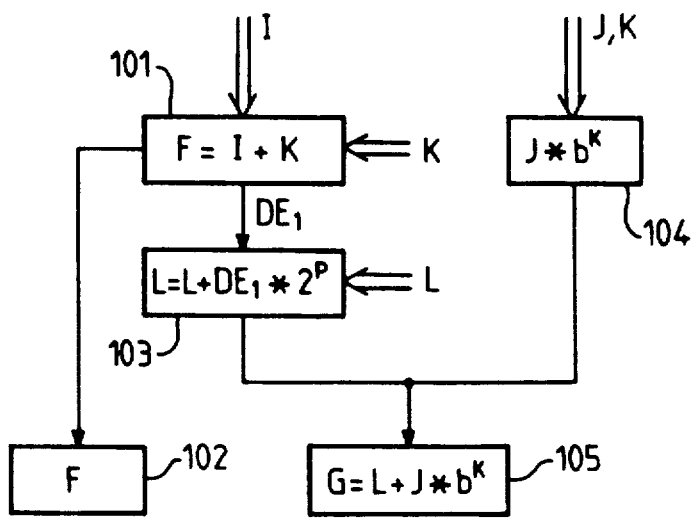
FIGS. 3A and 3B show two block diagrams of the process of management respectively in the case of the metacyclic group and of the second non-commutative group.
Figure 3B:
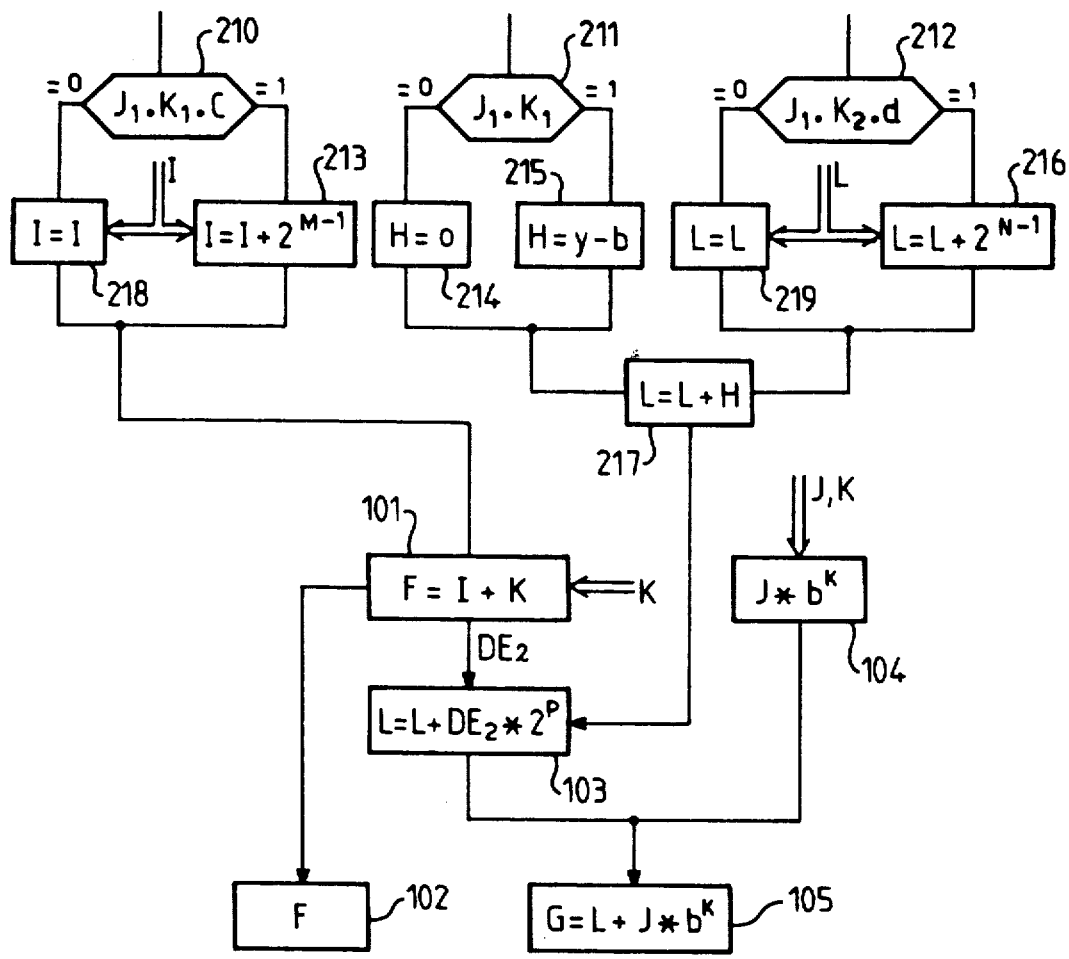

According to the invention, the two input address words are both separated into two fields, to which the management unit applies the operation which defines the non-commutative group. Such a group is preferably the metacyclic group of the formula 3. FIGS. 3A and 3B represent two block diagrams of the management process operating on these non-commutative groups.

The two input words are each separated into two fields, such that:

the first word is separated into a field I of M bits and into a field J of N bits,
the second word is separated into a field K of M bits and into a field L of N bits.

FIG. 3A relates to the metacyclic group. In a stage 101, the fields I and K are added in order to supply the field F which is delivered (stage 102). In the course of the step 101, the addition which is executed on two fields of M bits may generate an overflow bit DE1 appearing on the (M+1)-th bit. It is used in the course of step 103:

when this bit is at zero, the value of the input field L is not altered, when this bit is at one, the value of the input field L is added to an overflow word of value $2^P$. The generation of this word simply consists in placing the overflow bit on the (P+1)-th bit of a word of N bits, all the other bits of the word being at zero. This overflow word is added to the value of L. The value of P is a constant which is characteristic of the selected non-commutative group.

The step 104 consists in combining the fields J and K according to the expression $J^* b^K$. The field G is then determined (step 105) by adding $J^* b^K$ to the result obtained after the step 103 according to $G = L + J^* b^K$. The field F constitutes the M most significant bits and the field G constitutes the N least significant bits of the final result.

FIG. 3B relates to the second non-commutative group. The same steps 101 to 105 are found again, but with certain modifications.

The value I for the step 101 and the value L for the step 103 have both undergone a conditioning, the step 101 relates to an addition executed on (M+1) bits, the step 103 relates to an addition executed with an overflow word obtained no the basis of the two overflow bits DE2, i.e. the (M+1)-th and the (M+2)-th bit, which are delivered at the step 101.

The input fields I, J, K, L are formed respectively of the bits $(I_M \ldots I_1)$, $(J_N \ldots J_1)$, $(K_M \ldots K_1)$, $(L_N \ldots L_1)$, where the index of order 1 relates to the least significant bit of each field, respectively.

For the second non-commutative group, the process further comprises the following conditioning steps:

the step 210 operates the logic AND between the bits $J_1$, $K_1$ and a bit C which is a predetermined constant of the group:

when the result of this step is at 0, the value of the input field I is not modified (I=I) (step 218), when the result of this step is at 1, the value of the input field I is replaced by a new value such that $I(new) = I(old) + 2^{M-1}$ (step 213).

It is this new value on (M+1) bits which is utilized for the step 101;

the step 211 operates the logic AND between $J_1$ and $K_1$:

when the result is at 0, a temporary value H is set to zero (step 214), when the result is at one, the temporary value H is loaded with y−b (step 215). y and b are predetermined constants of the groups;

the step 212 operates the logic AND between $J_1$, $K_2$ and a bit d which is a predetermined constant of the group:

when the result is at zero, the value L of the input field is not modified (L=L) (step 219), when the result is at 1, the value of L of the input field is replaced by a new value L such that $L(new) = -L(old) + 2^{N-1}$ (step 216);

the step 217 operates the addition of the new value L with H which takes the place of L such that $L(new) = L(old) + H$. It is this last value of L which is utilized for the step 103.

The sequence of the steps is executed as in the case described for the organigram of FIG. 3A.

Figure 4A:
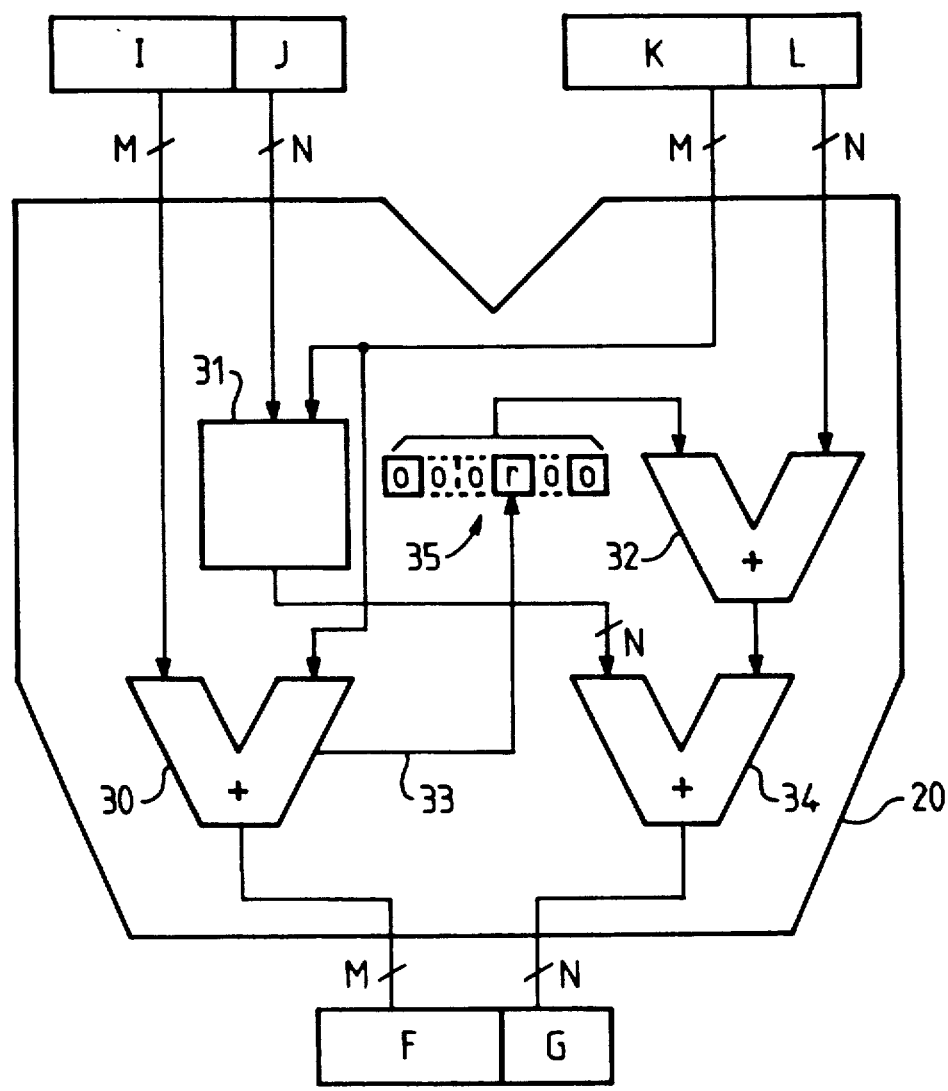
FIGS. 4A and 4B show two diagrams of the management unit for the implementation of the process respectively in accordance with the metacyclic group and in accordance with the second non-commutative group, respectively.

FIG. 4A represents a diagram of the management unit according to the invention for the implementation of the process according to the metacyclic group.

The management unit comprises a first adder 30 which adds I and K and delivers the field F on M bits. A computation element 31, which receives J and K, determines the expression $J*b^K$. This computation element is, for example, a table which stores predetermined values. This table is, for example, a programmable logic array PLA. The overflow of the adder 30, which appears on the connection 33, is input into shifter 35 and supplies an overflow word. This amounts to placing the overflow bit in the (P+1)-th position of the word, that is to say to multiplying the overflow bit by $2^P$. This overflow word is added to L in a second adder 32. Its output is added with the output of the element 31 in a third adder 34 which delivers, on N bits, the field G of the final result.

Figure 4B:
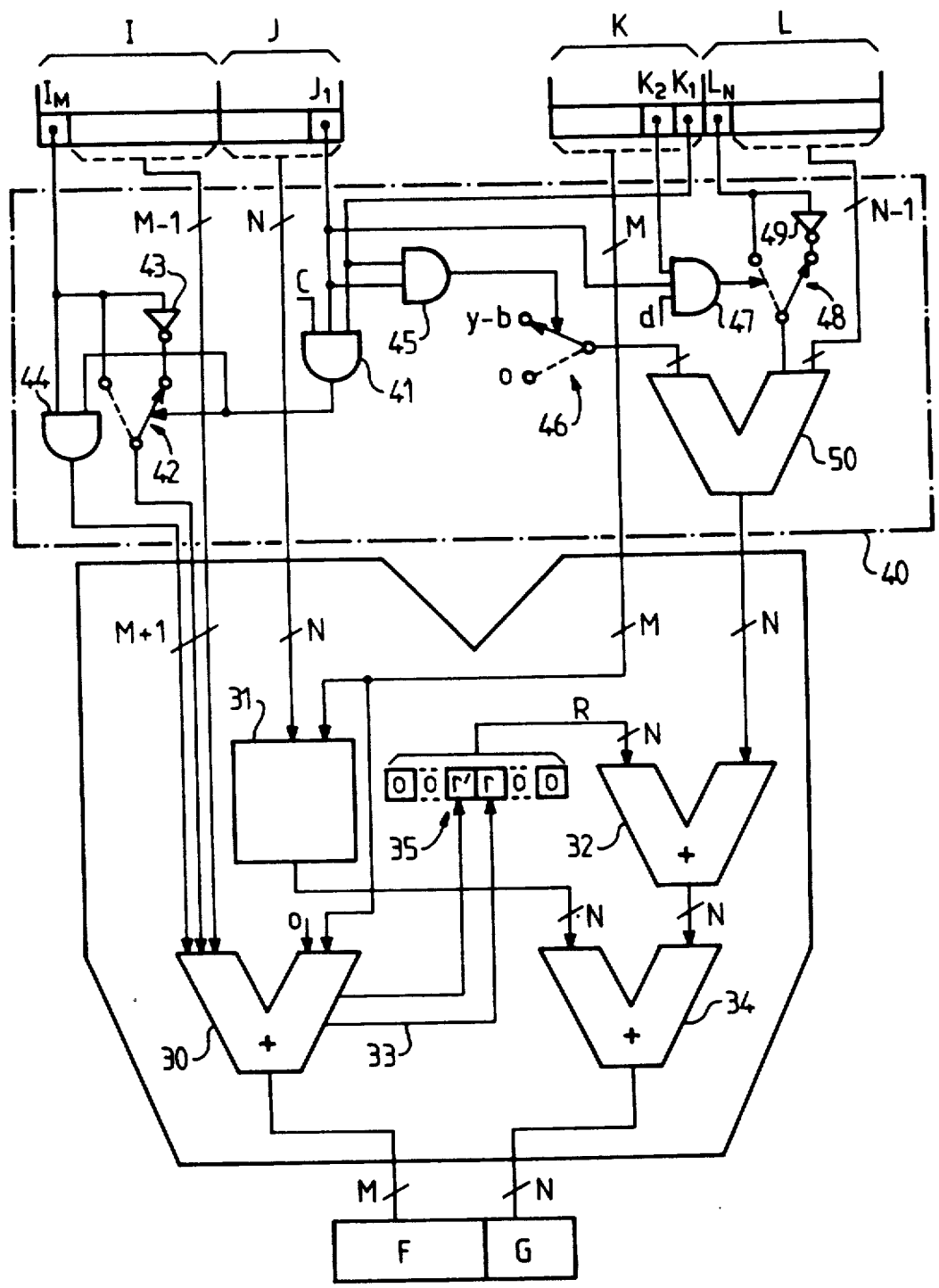

FIG. 4B represents a diagram of the management unit for the implementation of the process according to the invention to the second type non-commutative group. It comprises the same elements as those of FIG. 4A, with the following modifications:

the first adder 30 operates on (M+1) bits, but the input field I is modified by a conditioning circuits 40, the first adder 30 delivers two overflow bits DE2, which are input in the shifter 35, the second adder 32 operates with a field L modified by the conditioning circuit 40.

The conditioning circuit 40 comprises, on a first channel which modifies the input field I:

a first AND gate 41 which receives $J_1$ and $K_1$ and a bit C. The bits $J_1$ and $K_1$ are the least significant bits respectively of the fields J and K and the bit C is a characteristic of the selected group;

the output of the AND gate 41 activates a first selector 42, which selects either the most significant bit $I_M$ of the field I or its inverse delivered, for example, by an inverter 43;

the output of the AND gate 41 likewise enters a second AND gate 44, which also receives $I_M$.

The modified field I which enters the adder 30 is thus formed:

of the (M−1) least significant bits of the field I of the input word, of the output of the selector 42 as M-th bit, of the output of the second AND gate 44 as (M+1)-th bit.

The adder 30 receives, on its second input, the field K positioned on the M least significant inputs, the (M+1)-th input being at zero.

The conditioning circuit 40 likewise comprises, on a second channel:

a third logic AND gate 45 which receives $J_1$ and $K_1$ and which activates a second selector 46 which selects between a zero value or a value (y−b), where y and b are constants of the selected group according to a word of N bits, a fourth logic AND gate 47 which receives $J_1$ and $K_2$, which is the second least significant bit of the field K of the input word. The AND gate 47 likewise receives a bit d which is a constant of the selected group, the output of the AND gate 47 which activates a third selector 48 which selects either the $L_N$ bit which is the most significant bit of the field L or its inverse obtained, for example by an inverter 49, a fourth adder 50 which receives, on an input, the output of the second selector 46 and on the other input, the (N−1) least significant bits of the field L of the input word and as N-th bit, the output of the third selector 48. The output of the fourth adder 50 delivers the value of the modified field L which enters the second adder 32. The other elements of the management unit operate in the same way as that already described in the case of FIG. 4A. Thus, the management unit delivers at the output a destination address formed of the field F for the M most significant bits and of the field G for the N least significant bits.

Thus, the destination address is formed of the two fields F and G. The management unit of FIG. 4A or 4B may be used for the purposes of the computation of the addresses, instead of the arithmetic and logic unit which is customarily utilized for this function. When the operation which defines the group is to be applied consecutively on a plurality of occasions, the result obtained on the occasion of the first application is retrocoupled to the input of the management unit and so on.

The values to be given to the constants C, y, P, b, d of the second non-commutative group are defined in advance by the user, depending upon the type of application to be processed. The example of FIG. 6 indicates how this determination is undertaken. It is presented in the form of an arbitrary graph, in order to describe any application, but it is nevertheless simplified to a few nodes in order to avoid complicating the description.

Figure 6:
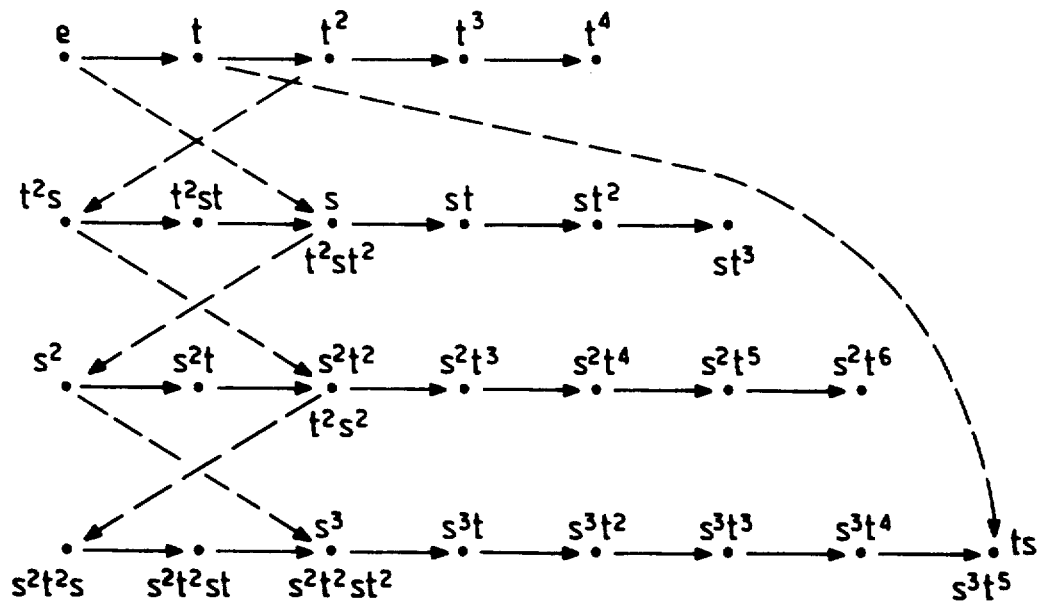
FIG. 6 shows a second example representing any graph problem.

The chart of FIG. 6 is described according to the indications of the arrows with reference to two generators referred to as s and t. The arrows in solid lines relate to the generator t and the arrows in broken lines relate to the generator s. At each node there are represented the combinations of s and of t which are necessary in order to reach the nodes represented by the points of the chart, the element e being the initial node. When a plurality of paths are possible, it follows therefrom that relations specific to the chart appear. In the example, four relations appear:

$$s = t^2 s t^2$$

$$s^2 t^2 = t^2 s^2$$

$$s^3 = s^2 t^2 s t^2$$

$$ts = s^3 t^5 \quad (5)$$

Furthermore, it is observed that there are at most seven consecutive links concerning the generator t and three consecutive links concerning the generator s. The minimum size of the storage component must be such that $2^N$ is greater than 7 and $2^M$ is greater than 3.

Let us seek a solution in the case of the second non-commutative group defined by the general relations:

$$t^{2^N} = e; \; s^{2^M} = t^{2^P};$$

$$ts = s^{1+C*2^{M-1}} t_y;$$

$$t^2 s = s t^{2b}; \; ts^2 = s^2 t^{b2 + d*2^{N-1}}. \quad (6)$$

By applying standard computations of group theory to the relations 5 and 6, the system of relations 5 may be reduced in the intermediate system:

$$t^2 s = s t^{-2}; \; s t^2 = t^{-2} s; \; ts = s^3 t^5$$

which itself reduces to:

$$t^2 s = s t^{-2}; \; ts = s^3 t^5$$

On comparing with the relations (6), the following is obtained:

$$2b = -2 \text{ i.e. } b = -1$$

$$ts = s^3 t^5 = s^{1+C*2^{M-1}} t_y, \text{ i.e. } y = 5, C = 1 \text{ and } M = 2.$$

At this stage of computation, the constraints determined are: b=1; C=1; M=2; y=5; $2^N$ greater than 7.

In order to determine the parameters of the second non-commutative group, it is necessary to take into account of the following constraints of Table 1:
$b^{2M} - 1$ must be a multiple of $2^{N-1}$
$b - 1$ must be a multiple of $2^{N-P}$
C has the value 0 or 1
$b^{C*2M-1} - 1$ must be a multiple of $2^{N-1}$
d has the value 0 or 1
$(y-b)*(b+1) - d*2^{N-1}$ must be a multiple of $2^P$ (if $C*2^{M-2}$ is even) test $b^{C*2M-1} - 2*(b-y) - 1$ which must be a multiple of $2^P$
(if $C*2^{M-1}$ is odd) test $b^{C*2M-1} - 2*(b-y) + d*2^{N-1} - 1$ which must be a multiple of $2^P$.

TABLE 1

The parameters of the non-commutative group being given only by implicit equations, they must be determined by verifying the equations with the aid of possible values until all constraints which have already been mentioned are respected. This is carried out by means of a simple computer program, easily executed by a person skilled in the art, respecting the constraints imposed. It is sufficient to program, for each parameter, the following values:

```
when N is not known, successively do N = 1, 2, 3, . . .
when M is not known, do M = 1, 2, 3, . . .
when P is not known, do P = 1, 2, 3, . . . , N
when b is not known, do b = 1
                then b = 1 + 2^{N-P}
                then b = 1 + 2*2^{N-P}
                until b = 1 + (2^P - 1)*2^{N-P}
when d is not known, do d = 0 then d = 1
when C is not known, do C = 0
                then C = 1
when y is not known, do y = 1, 3, 5, 7, . . . , 2^N - 1.
```

In the example which has just been described, the values determined with the aid of the equations are b = -1, C = 1, y = 5, M = 2, $2^N$ greater than 7.

It is possible to choose N = 3; this gives a group of size $2^{M+N} = 32$.

It is verified that:
$b^{2M} - 1 = 0$ is a multiple of $2^{N-1} = 4$
$b^{C*2M-1} - 1 = 0$ is a multiple of $2^{N-1} = 4$ The following constraints remain:
d must be equal to 0 or 1
$(y-b)*(b+1) - d*2^{N-1} = -4d$ must be a multiple of $2^P$, with P within the range between 1 and N.

Choosing, for example, P = 2 and d = 0 gives all the parameters of the non-commutative group, which corresponds to the chart of FIG. 6. These parameters are: N = 3; M = 2; P = 2; b = -1; y = 5, d = 0; C = 1.

The process previously described in connection with FIG. 3B may also operate with these parameters. Likewise, the management unit of FIG. 4B may operate in order to address the various nodes of the chart according to this non commutative group.

In order to show clearly the entire benefit of this mode of addressing, a simple example will be expressed with a metacyclic group. Quite clearly, the only matter involved is that of providing a good understanding of the invention, but the latter also relates to generating address words in situations which are more highly developed.

Figure 5A:
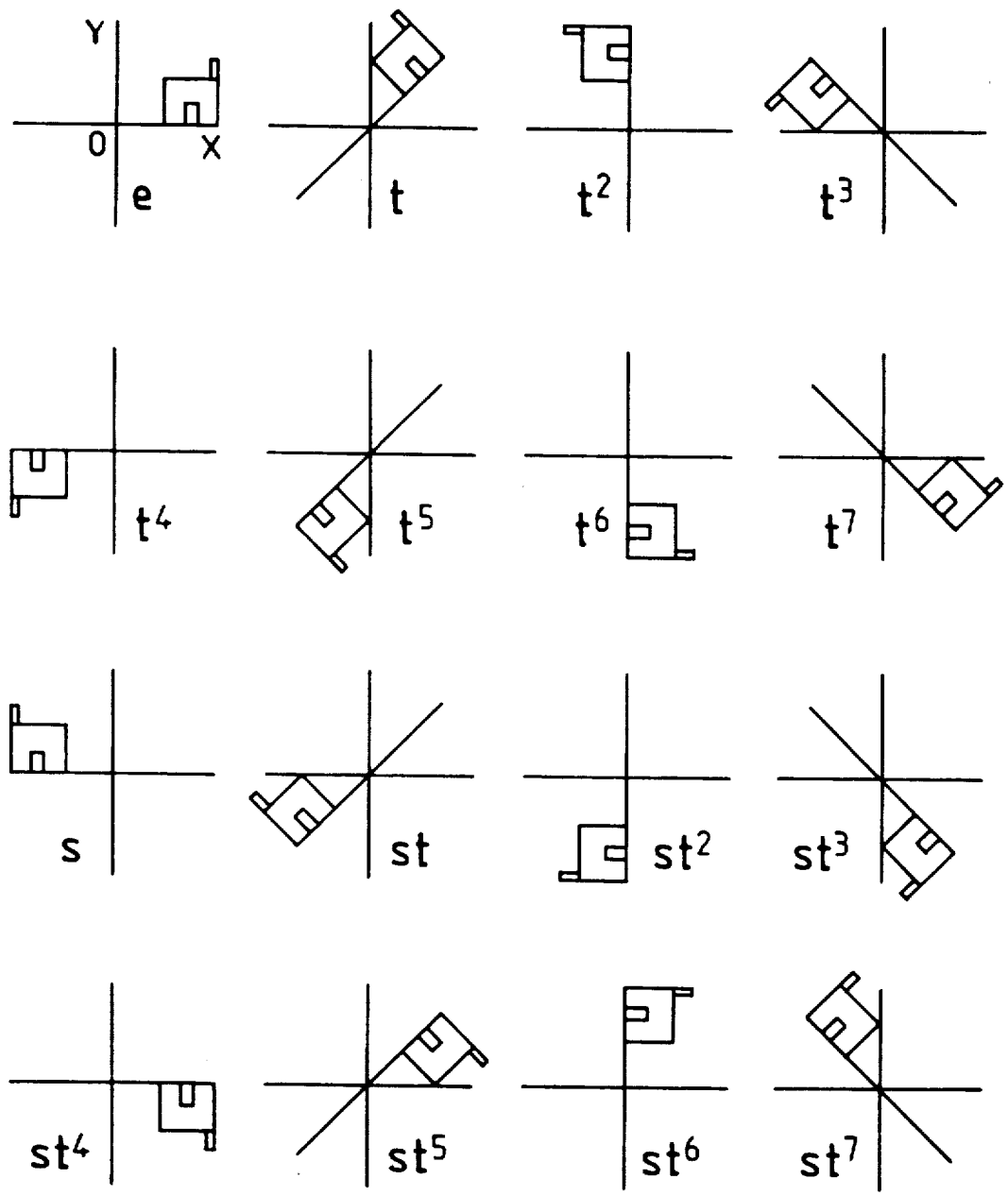

The example is constituted by the problem of rotation symmetry in a plane. What is involved here is symmetry in relation to the vertical axis OY and rotation through 45°. The top parts of FIGS. 5A and 5B correspond to the rotations with the eight possible configurations, the original element being referred to as e. The bottom parts of FIGS. 5A and 5B correspond to the case where a symmetry is applied to the eight preceding rotations; this provides eight new configurations. FIG. 5B represents, for each indicated case, the matrix associated with the operation as well as the two address fields s, t in the dihedral group having 16 elements in accordance with the example, i.e. $N=3$, $M=1$, $P=3$, $b=-1$.

In this problem of rotation symmetries, let us consider the case of a point Q of the object represented (a house) of coordinates (2, 1) and let us apply successively to it a rotation of 135° and then a symmetry and then a rotation of 45°.

For the purposes of the conventional computation, it is necessary to operate a matrix multiplication such that:

$$Q': \begin{vmatrix} x \\ y \end{vmatrix} = \begin{vmatrix} \sqrt{2}/2 & -\sqrt{2}/2 \\ \sqrt{2}/2 & \sqrt{2}/2 \end{vmatrix} \begin{vmatrix} -1 & 0 \\ 0 & 1 \end{vmatrix} \begin{vmatrix} -\sqrt{2}/2 & -\sqrt{2}/2 \\ \sqrt{2}/2 & -\sqrt{2}/2 \end{vmatrix} \begin{vmatrix} 2 \\ 1 \end{vmatrix}$$

Performance of the multiplication of these three matrices gives $$Q': \begin{vmatrix} 1 \\ 2 \end{vmatrix}$$

According to the invention the operation is carried out not on the values of the coordinates but on the addresses which are separated into two fields s and t, on which the operations previously defined, represented by $(I,J)\$(K,L)=(F,G)$ i.e. $(I,J)\$(K,L)=[(I+K), (L+J*b^K+)overflow\ of\ (I+K)*2^P)]$ are executed twice.

For the rotation symmetries $b=-1$, whence:

$F = I + K$ modulo $2^M$ $G = L + J*(-1)^{K1} + [overflow\ of\ (I+K)]*2^P$

For the selected example, let us consider the following 3 successive operations:

rotation of 135° $(s,t)=(0,3)$ symmetry $(s,t)=(1,0)$ rotation of 45° $(s,t)=(0,1)$ The operation which defines the group, when applied twice to these fields gives for the 3 successive operations:

$(0,3)\$(1,0)\$(0,1)=(1,5)\$(0,1)=(1,6)$ that is to say, in FIG. 5A, the case $st^6$, for which the matrix is $$\begin{vmatrix} 0 & 1 \\ 1 & 0 \end{vmatrix}$$

It is then sufficient to execute a single multiplication of the matrix by the coordinates of Q:

$$Q': \begin{vmatrix} 0 & 1 \\ 1 & 0 \end{vmatrix} \begin{vmatrix} 2 \\ 1 \end{vmatrix} = \begin{vmatrix} 1 \\ 2 \end{vmatrix}.$$

According to the invention, simple computations are thus executed on the address fields, these being easily implemented in the management unit, and no longer matrix multiplications which necessitate a processing which is far more complex and long. When the operation which defines the group is to be applied on a plurality of occasions consecutively, the result obtained on the occasion of the first application is reinput at the input of the management unit and so on.

Figure 7:
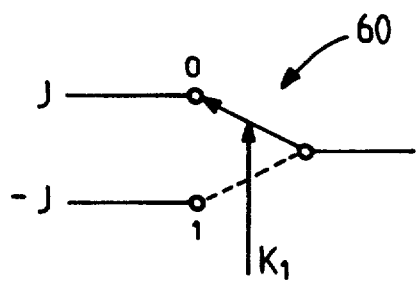
FIG. 7 shows a modification of the diagram of FIGS. 4A and 4B concerning the determination of $J^* b^K$ in the case where $b = -1$ modulo $2^N$, for example, for an application to a problem of rotation symmetry.

In the case of the symmetry rotations, the constant b is equal to $-1$. In this case, the determination of the expression $J*b^K$ by the management unit amounts to utilizing either J or $-J$, depending upon whether $K_1$ is equal to 0 or 1 respectively. In this case, the computation element 31 of FIG. 4A is modified in accordance with the diagram of FIG. 7. It is replaced by a selector 60 which selects the 2's complement of J, i.e. $-J$ when $K_1$ is at 1 and J when $K_1$ is at zero.

According to the invention, the operation which defines the group necessitates only simple computations and permits the elimination of a large number of memory access; this increases the speed of addressing when the problems to be processed become more complex. Furthermore, the inverse law permits the execution of the operations in the inverse sense.

The address word management unit which has just been described may be utilized in any data processing structure or any data storage structure for which it is necessary to execute an addressing of these data.

We claim:

1. A method for processing, in a data processor, input address words of $M+N$ bits each to generate destination addresses for an addressable structure, the method comprising the following steps:

receiving first and second input address words, separating each of the input address words into two fields such that:

the M most significant bits and the N least significant bits of the first input word become fields I and J, respectively, and the M most significant bits and the N least significant bits of the second input word become fields K and L, respectively, where M and N are integers greater than zero, and combining these fields in accordance with an operation to generate the destination addresses for the addressable structure, which destination addresses comprise two fields F and G constituting respectively the M most significant bits and the N least significant bits resulting from the combining step, which operation defines a non-commutative group when applied to the set of possible input addresses.

2. A method as claimed in claim 1, wherein in the combining step comprises using the operation defined by the following equations, which result in the group being metacyclic:

$F = I + K$ modulo $2^M$ and $G = L + J*b^K + \{overflow\ of\ (I+K)\}*2^P$ modulo $2^N$ where b and P are predetermined constants of the group such that $b^{2M}-1$ is a multiple of $2^N$ and $b-1$ is a multiple of $2^{N-P}$, and P is a positive integer equal to or less than N, and where the symbols (+) and (*) represent the operations of addition and of multiplication respectively.

3. A method as claimed in claim 1, wherein the fields I, J, K, L, are formed respectively of the bits $(I_M \ldots I_1)$, $(J_N \ldots J_1)$, $(K_M \ldots K_1)$, $(L_N \ldots L_1)$ where the index of order 1 relates to the least significant bit of each field, wherein the combining step comprises using the operation defined by the following equations:

$$F = I + K + J_1 \cdot K_1 C^* 2^{M-1} \text{ modulo } 2^M$$
$$G = L + J^* b^K + J_1 \cdot K_1^*(y - b) + J_1 \cdot K_2 \cdot d^* 2^{N-1} +$$
$$[\square\{\text{overflow of } (I + K + J_1 \cdot K_1 \cdot C^* 2^{M-1})\}\square]^* 2^P \text{ modulo } 2^N$$

where the symbols +, *, and . represent respectively addition, multiplication and the logic AND function, and where C, y, P, b, and d are predetermined constants of the group which satisfy the following equations:
$b^{2M} - 1$ must be a multiple of $2^{N-1}$
$b - 1$ must be a multiple of $2^{N-P}$
C has the value 0 or 1
$b^{C^* 2^{M-1}} - 1$ must be a multiple of $2^{N-1}$
d has the value 0 or 1
$(y-b)^*(b+1) - d^* 2^{N-1}$ must be a multiple of $2^P$
if $C^* 2^{M-2}$ is even, $b^{C^* 2^{M-1}} - 2^*(b-y) - 1$ must be a multiple of $2^P$
if $C^* 2^{M-2}$ is odd, $b^{C^* 2^{M-1}} - 2^*(b-y) + d^* 2^{N-1} - 1$ must be a multiple of $2^P$.

4. Apparatus for processing, in a data processor, input address words of M+N bits each to generate destination addresses for an addressable structure, the apparatus comprising:
means for receiving first and second input address words,
means for separating each of the input address words into two fields such that:
  the M most significant bits and the N least significant bits of the first input word become fields I and J, respectively,
  the M most significant bits and the N least significant bits of the second input word become the fields K and L, respectively,
means for supplying destination addresses, each destination address comprising two fields F and G consisting respectively of the M most significant bits and of the N least significant bits supplied by the means for supplying,
a first adder which delivers the field F such that $$F = I + K \text{ modulo } 2^M,$$

a shifter which shifts by P binary positions the overflow bit delivered by the first adder and which delivers, on N bits, a shifted overflow item R,
a second adder which adds L and the shifted overflow item R,
a computing element which determines the expression $J^* b^K$,
a third adder which adds the result delivered by the computing element with the result delivered by the second adder and which delivers the field G such that $$G = L + J^* b^K + R \text{ modulo } 2^N$$

where b and P are predetermined constants of the group such that $b^{2M} - 1$ is a multiple of $2^N$ and $b - 1$ is a multiple of $2^{N-P}$, and P is a positive integer less than N, where M and N are integers greater than zero.

5. Apparatus according to claim 4,

I) wherein the first adder operates on (M+1) bits and delivers 2 overflow bits which are input and shifted in the shifter
II) the apparatus further comprising a circuit for being formed respectively of the bits $(I_M \ldots I_1)$, $(J_N \ldots J_1)$, $(K_M \ldots K_1)$, $(L_N \ldots L_1)$, where the index of order 1 relates to the least significant bit of each field, the conditioning circuit comprising:
on a first channel:
  a first AND gate which receives $J_1$, $K_1$ and a bit C
  a second AND gate which receives $I_M$ and the output of the first AND gate
  a first selector, actuated by the output of the first AND gate, which selects $I_M$ or its inverse logic value in such a manner that the first adder receives on one input:
    the M − 1 least significant bits of the field I of the input address word,
    the output of the first selector as M-th bit,
    the output of the second AND gate as (M+1)-th bit, and
  on the other input, the field K positioned on the M least significant bits of this input, the (M+1)-th bit being at zero,
on a second channel:
  a third logic AND gate which receives $J_1$ and $K_1$
  a second selector actuated by the third AND gate which selects a value y−b or a null value,
  a fourth logic AND gate, which receives $J_1$, $K_2$ and a bit d,
  a third selector actuated by the fourth AND gate which selects $L_N$ or its inverse logic value,
  a fourth adder which receives on one input the output of the second selector and on the other input the (N−1) least significant bits of the field L of the input address word as well as the output of the third selector as N-th bit, the output of the fourth adder entering the second adder,
where C, y, P, B, d are predetermined constants of the group, which satisfy the following conditions:
$b^{2M} - 1$ must be a multiple of $2^{N-1}$
$b - 1$ must be a multiple of $2^{N-P}$
C has a value 0 or 1
$b^{C^* 2^{M-1}} - 1$ must be a multiple of $2^{N-1}$
d has the value 0 or 1
$(y-b)^*(b+1) - d^* 2^{N-1}$ must be a multiple of $2^P$
if $C^* 2^{M-2}$ is even, $b^{C^* 2^{M-1}} - 2^*(b-y) - 1$ must be a multiple of $2^P$
if $C^* 2^{M-1}$ is odd, $b^{C^* 2^{M-1}} - 2^*(b-y) + d^* 2^{N-1} - 1$ must be a multiple of $2^P$.

6. Apparatus according to claim 5, wherein the computation element comprises a table storing the predetermined values.

7. Apparatus according to claim 4, wherein the computation element comprises a table storing the predetermined values.

8. Apparatus according to claim 4, wherein, in the case where $b = -1$ modulo $2^N$, the computing element is a selector which selects the 2's complement of J when $K_1$ is at 1 and J when $K_1$ is at zero.

9. Data processing structure, characterized in that it comprises an address management unit according to one of claims 4 to 8.

10. Data storage structure, characterized in that it comprises an address management unit according to one of claims 4 to 8.

* * * * *